United States Patent

Szyszka et al.

(10) Patent No.: US 9,544,743 B2
(45) Date of Patent: Jan. 10, 2017

(54) METHODS AND SYSTEMS FOR ADDING A MOBILE RADIO TO A TALKGROUP

(71) Applicant: MOTOROLA SOLUTIONS, INC, Schaumburg, IL (US)

(72) Inventors: Grzegorz Szyszka, Kraków (PL); Michal Szychowski, Cracow (PL); Mariusz R Wawrowski, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/882,089

(22) Filed: Oct. 13, 2015

(65) Prior Publication Data

US 2016/0105778 A1 Apr. 14, 2016

(30) Foreign Application Priority Data

Oct. 14, 2014 (EP) .................................. 14460068

(51) Int. Cl.
*H04B 7/00* (2006.01)
*H04W 4/08* (2009.01)
(Continued)

(52) U.S. Cl.
CPC .............. *H04W 4/08* (2013.01); *H04L 63/065* (2013.01); *H04L 63/104* (2013.01); *H04W 4/008* (2013.01); *H04W 12/06* (2013.01); *H04L 63/0807* (2013.01)

(58) Field of Classification Search
CPC ........ H04W 4/08; H04W 4/008; H04W 12/06; H04L 63/065; H04L 63/0807; H04L 63/104

(Continued)

(56) References Cited

U.S. PATENT DOCUMENTS 8,189,583 B2 * 5/2012 LoGalbo ............... H04W 8/186
370/228
8,522,019 B2 8/2013 Michaelis
(Continued)

FOREIGN PATENT DOCUMENTS

EP 2 002 363 B1 8/2013
EP 2 301 193 B1 9/2013
WO 2014/028389 A1 2/2014

OTHER PUBLICATIONS

Schwarzkopf, K et al., Mobile location-based voice over internet protocol group call service, 2011 IEEE EUROCON—International Conference on Computer as a Tool (EUROCON), Apr. 27-29, 2011, Retrieved from the Internet URL: http://ieeexplore.ieee.org/stamp/stamp.jsp?arnumber=5929331, retrieved on Feb. 23, 2016, pp. 1-4.

(Continued)

*Primary Examiner* — Dominic Rego

(57) ABSTRACT

At least one embodiment takes the form of a process carried out by a first radio-network switching system (RNSS). The first RNSS maintains a talkgroup of mobile radios that includes a first mobile radio. The first RNSS receives an add-mobile-radio request from the first mobile radio and responsively sends an add-mobile-radio response to the first mobile radio. The add-mobile-radio response includes an add-mobile-radio authentication token. The first RNSS receives, from a second mobile radio, an add-mobile-radio authentication message that identifies the second mobile radio and that includes the add-mobile-radio authentication token. In response to receiving the add-mobile-radio authentication message from the second mobile radio, the first RNSS adds the identified second mobile radio to the talkgroup.

6 Claims, 7 Drawing Sheets

(51) Int. Cl.
  *H04W 12/06* (2009.01)
  *H04W 4/00* (2009.01)
  *H04L 29/06* (2006.01)

(58) Field of Classification Search
  USPC ....... 455/517–520, 553.1, 90.2, 78, 79, 500, 455/426.1, 412.1, 414.1, 416, 420; 370/352, 370/389, 338, 328
  See application file for complete search history.

(56) References Cited

U.S. PATENT DOCUMENTS

| | | | |
|---|---|---|---|
| 8,621,656 B2 | 12/2013 | Miettinen et al. | |
| 8,687,536 B2 | 4/2014 | Michaelis | |
| 8,695,078 B2 | 4/2014 | Low et al. | |
| 2003/0186716 A1* | 10/2003 | Dorenbosch | H04W 72/005 455/519 |
| 2005/0220079 A1* | 10/2005 | Asokan | H04W 76/025 370/352 |
| 2007/0019616 A1 | 1/2007 | Rantapuska et al. | |
| 2007/0021136 A1* | 1/2007 | Allen | H04B 1/3833 455/518 |
| 2007/0263560 A1 | 11/2007 | Saarisalo et al. | |
| 2011/0225238 A1* | 9/2011 | Shaffer | H04L 63/08 709/204 |
| 2011/0319117 A1* | 12/2011 | Gonsalves | H04L 12/1822 455/519 |
| 2012/0198531 A1 | 8/2012 | Ort et al. | |
| 2012/0230308 A1 | 9/2012 | Saito et al. | |
| 2013/0064160 A1* | 3/2013 | Newberg | H04W 76/002 370/312 |
| 2013/0301405 A1 | 11/2013 | Fuste Vilella et al. | |
| 2014/0056172 A1 | 2/2014 | Lee et al. | |
| 2014/0112244 A1* | 4/2014 | Lindner | H04L 65/4061 370/328 |
| 2015/0024804 A1* | 1/2015 | Davis | H04M 1/6066 455/569.1 |

OTHER PUBLICATIONS

European Search Report and Opinion for corresponding European Patent Application No. 14460068.1, mailed on Aug. 18, 2015.

\* cited by examiner

METHODS AND SYSTEMS FOR ADDING A MOBILE RADIO TO A TALKGROUP

This application is a US National Filing and is filed within one year of, and claims priority to under 35 U.S.C. §119, European Patent Application No. EP 14460068.1, filed in the European Patent Office on Oct. 14, 2014, the entire contents of which are incorporated herein by reference.

BACKGROUND OF THE INVENTION

People communicate wirelessly and on the go. Among the devices that make this possible are devices that are sometimes referred to as mobile two-way radios. Examples of mobile two-way radios include cell phones, smartphones, walkie-talkies, and portable hotspots, among others. A mobile two-way radio could be handheld (as may be the case for a walkie-talkie), body-mounted, or attached to a vehicle (such as the roof of a car), as examples.

Some users of some mobile two-way radios have specific requirements. For example, public-safety users may need push-to-talk (PTT) functionality, an officer-down alert, or direct mobile-to-mobile communication (for situations when, e.g., the mobile two-way radios are out of range of a wireless infrastructure), among numerous other examples that could be listed here.

One feature often needed by public-safety users is group calling, which in some variations allows for communication among multiple mobile two-way radios. Accordingly, there is a need for methods and systems for adding mobile radios to talkgroups.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
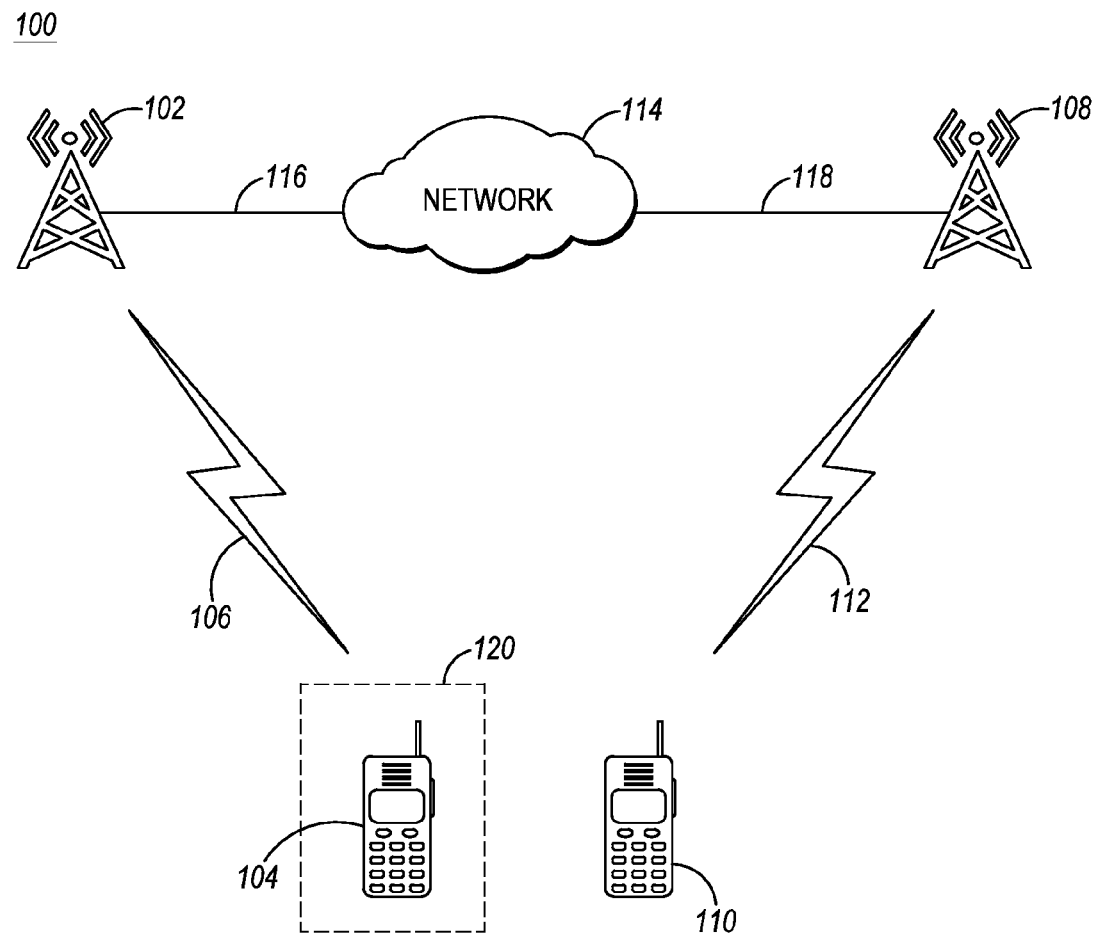
FIG. 1 depicts a communication system, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for adding a mobile radio to a talkgroup. At least one embodiment takes the form of a process carried out by a first RNSS. The first RNSS maintains a talkgroup of mobile radios that includes a first mobile radio. The first RNSS receives an add-mobile-radio request from the first mobile radio and responsively sends an add-mobile-radio response to the first mobile radio. The add-mobile-radio response includes an add-mobile-radio authentication token. The first RNSS receives, from a second mobile radio, an add-mobile-radio authentication message that identifies the second mobile radio and that includes the add-mobile-radio authentication token. In response to receiving the add-mobile-radio authentication message from the second mobile radio, the first RNSS adds the identified second mobile radio to the talkgroup.

Another embodiment takes the form of a first RNSS that includes a communication interface, a processor, and data storage containing instructions executable by the processor for causing the first RNSS to carry out a set of functions that includes at least the functions described in the preceding paragraph. Moreover, any of the variations and permutations described in the ensuing paragraphs and anywhere else in this disclosure can be implemented with respect to any embodiments, including with respect to any method embodiments and any system embodiments.

In at least one embodiment, the first RNSS generates the add-mobile-radio authentication token prior to sending the add-mobile-radio response to the first mobile radio.

In at least one embodiment, the authentication token comprises a sequence of randomly-selected symbols.

In at least one embodiment, the first mobile radio is homed on the first RNSS.

In at least one embodiment, receiving the add-mobile-radio authentication message from the second mobile radio includes receiving the add-mobile-radio authentication message from the second mobile radio via the first RNSS. In at least one such embodiment, the second mobile radio is homed on the first RNSS.

In at least one embodiment, receiving the add-mobile-radio authentication message from the second mobile radio includes receiving the add-mobile-radio authentication message from the second mobile radio via a second RNSS.

In at least one such embodiment, the second mobile radio is homed on the second RNSS.

In at least one other such embodiment, the first RNSS implements a first radio-access technology (RAT) and the second RNSS implements a second RAT that is different from the first RAT. In at least one embodiment, at least one of the first RAT and the second RAT includes one or more of Association of Public-Safety Communications Officials-International (APCO) Project 25 (P25), digital mobile radio (DMR), professional commercial radio (PCR), Terrestrial Trunked Radio (TETRA) (all of the foregoing of which may be referred to as infrastructure mode land mobile radio (LMR) systems), and Long-Term Evolution (LTE).

In at least one other such embodiment, both the first RNSS and the second RNSS implement a given RAT.

In at least one other such embodiment, prior to the first RNSS receiving the add-mobile-radio authentication token, the second RNSS determines that the second mobile radio is permitted to join the talkgroup.

In at least one other such embodiment, the first RNSS exchanges talkgroup data with the second mobile radio via the second RNSS.

In at least one embodiment, the second mobile radio receives the add-mobile-radio authentication token from the first mobile radio. In at least one such embodiment, the second mobile radio receives the add-mobile-radio authentication token from the first mobile radio via a short-range communication protocol and while in close proximity to the first mobile radio. In at least one such embodiment, the short-range communication protocol includes at least one of near-field communication (NFC), direct mode land mobile radio (LMR), and Bluetooth communication.

In at least one embodiment, the first RNSS confirms that the add-mobile-radio authentication token included in the received add-mobile-radio authentication message matches the add-mobile-radio authentication token included in the sent add-mobile-radio response.

In at least one embodiment, the add-mobile-radio authentication token is associated with an authentication-token timer. Prior to adding the identified second mobile radio to the talkgroup, the first RNSS confirms that the authentication-token timer has not expired.

In at least one embodiment, the first RNSS, subsequent to adding the identified second mobile radio to the talkgroup, does as follows: The first RNSS invalidates the authentication token, and subsequently receives a second add-mobile-radio authentication message that identifies a third mobile radio and that includes the add-mobile-radio authentication token. In response to receiving the second add-mobile-radio authentication message, the first RNSS determines that the authentication token is invalidated and denies the third mobile radio access to the talkgroup.

In at least one embodiment, prior to sending the add-mobile-radio response to the first mobile radio, the first RNSS determines that the first mobile radio is permitted to invite one or more other mobile radios to the talkgroup.

At least one embodiment takes the form of a process carried out by a first mobile radio that is a member of a talkgroup. The first mobile radio detects an add-mobile-radio trigger and, in response to detecting the add-mobile radio trigger, both (i) generates an add-mobile-radio request and (ii) sends the add-mobile-radio request to a first radio-network switching system over a first wireless communication interface. Subsequent to transmitting the add-mobile-radio request to the first radio-network switching system, the first mobile radio receives an add-mobile-radio response (that includes an add-mobile-radio authentication token) from the first radio-network switching system over the first wireless communication interface. The first mobile radio provides the add-mobile-radio authentication token to a second mobile radio over a second short-range communication interface and, subsequent to providing the add-mobile-radio authentication token to the second mobile radio, communicates with the second mobile radio via the talkgroup.

Another embodiment takes the form of a first mobile radio that includes a first wireless communication interface, a second short-range communication interface, a processor, and data storage containing instructions executable by the processor for causing the first mobile radio to carry out a set of functions that includes at least the functions described in the preceding paragraph. Moreover, any of the variations and permutations described in the ensuing paragraphs and anywhere else in this disclosure can be implemented with respect to any embodiments, including with respect to any method embodiments and any system embodiments.

In at least one embodiment, the second mobile radio receives the add-mobile-radio authentication token from the first mobile radio via a short-range communication protocol and while in close proximity to the first mobile radio. In at least one such embodiment, the short-range communication protocol takes the form of (or includes) NFC. In at least one other such embodiment, the short-range communication protocol takes the form of (or includes) Bluetooth communication or direct mode land mobile radio (LMR) communication. In at least one embodiment, the second mobile radio receives the add-mobile-radio authentication token from the first mobile radio.

In at least one embodiment, detecting the add-mobile-radio trigger includes the first mobile radio detecting selection, via a user interface, of an add-mobile-radio command.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts a communication system, in accordance with at least one embodiment. As shown, a communication system 100 includes RNSSs 102 and 108 and mobile radios 104 and 110.

Mobile radio 104 and/or 110 could be any mobile radio configured to perform the mobile-radio functions described herein. In addition to the examples described above, either or both mobile radios could take the form of mobile phones, smart phones, tablet computers, and/or any combination of these, among numerous other possibilities. In addition to providing wireless-communication capabilities, either or both of mobile radio 104 and mobile radio 110 may include a respective user interface (including elements such as a touchscreen, keyboard, microphone, speakers, and the like) with which a user may interact with the respective mobile radio.

An example structure of RNSS 102 is described below in connection with FIG. 5. In general, either or both of RNSS 102 and RNSS 108 could be any RNSS equipped and configured by those of skill in the relevant art to function as described herein. In different embodiments, an RNSS could take the form of or include a base station, a radio access network (RAN), a subpart of a RAN, and/or a wireless wide area network (WWAN), as a few representative examples. RNSS 102 and RNSS 108 could be controlled by different network operators, or by a common network operator. In various different embodiments, RNSS 102 and/or RNSS 108 may include one or more elements such as base stations, base station controllers, routers, switches, and the like, arranged, connected, and programmed to provide wireless service to, e.g., mobile radio 104 and/or mobile radio 110 in a manner that in general is known to those of skill in the relevant art. Either or both of RNSS 102 and RNSS 108 could take the form of respective public-safety radio networks. In an embodiment, RNSS 102 is a public-safety radio network and RNSS 108 is a commercial radio network. And certainly numerous other possible implementation examples could be listed here.

In the embodiment illustrated in FIG. 1, RNSS 102 and RNSS 108 are communicatively connected via respective communication links 116 and 118 to a network 114, which could take the form of or include a circuit-switched network (such as the Public Switched Telephone Network (PSTN)), a packet-switched network (such as the Internet), and/or any other suitable network or networks.

RNSS 102 and/or RNSS 108 may implement one or more RATs and may communicate with mobile radios 104 and 110 over air-interface links 106 and 112 (respectively) according to the one or more RATs. Example RATs include APCO P25, DMR, PCR, TETRA (all of which are examples of land mobile radio (LMR)), infrastructure mode LMR, and LTE, among numerous other possibilities. In at least one embodiment, both RNSS 102 and RNSS 108 implement a common RAT, while in at least one other embodiment, RNSS 102 implements a first RAT and RNSS 108 implements a second RAT that is different from the first RAT. In an embodiment, at least one of the first and second RATs takes the form of (or includes) one or more of the example RATs listed above. And certainly other examples could be listed as well.

Downlink communication over air-interface 106 and/or air-interface 112 may be addressed to multiple mobile radios (e.g., multicast or broadcast using an identifier, such as a Subscriber Group ID (SGID), that is associated with a group of mobile radios), and/or to one or more single mobile radios (e.g., unicast using an identifier, such as a Subscriber Unit Identifier (SUID), that is uniquely associated with that mobile radio), among other possibilities that are known to those of skill in the art.

In the embodiment depicted in FIG. 1, mobile radio 104 is a member of a talkgroup 120 of one or more mobile radios. Though only mobile radio 104 is depicted as being a member of talkgroup 120, those of skill in the art will appreciate that talkgroup 120 may contain additional mobile radios, and that mobile radio 104 may be a member of one or more other talkgroups. While the term "talkgroup" is used in this disclosure, it will be understood by those of skill in the art that a term such as "communication group" could be used instead, and that the data being exchanged among the members of the group could be any suitable type of data, such as voice data, image data, video data, and the like.

Mobile radio 104 and/or mobile radio 110 may be "homed" on a respective RNSS (such as RNSS 102 or RNSS 108). As is generally known to those having skill in the relevant art, other equivalent expressions of this concept include "homed with," "homed to," and the like, and furthermore the RNSS on which a given mobile radio is homed is often referred to as the "homed RNSS" or "home RNSS" with respect to that mobile radio. The homed RNSS may be, for example, the RNSS for use of which a user of the mobile radio pays (or is otherwise subscribed, perhaps by an employer or other organization), and is sometimes the RNSS via which the mobile radio is configured to prefer to obtain wireless service. The homed RNSS is often (though not always) indicated by a unique identifier assigned to the mobile radio. Mobile radio 104 and/or mobile radio 110 are typically said to be "roaming" when not on their respective homed RNSSs.

In at least one embodiment, mobile radio 104 is homed on RNSS 102. In at least one other embodiment, both mobile radios 104 and 110 are homed on RNSS 102. RNSS 108 may or may not be present in such an embodiment. In at least one other embodiment, mobile radio 104 is homed on RNSS 102 and mobile radio 110 is homed on RNSS 108. Those of skill in the art will appreciate that other variations are possible.

Figure 2:
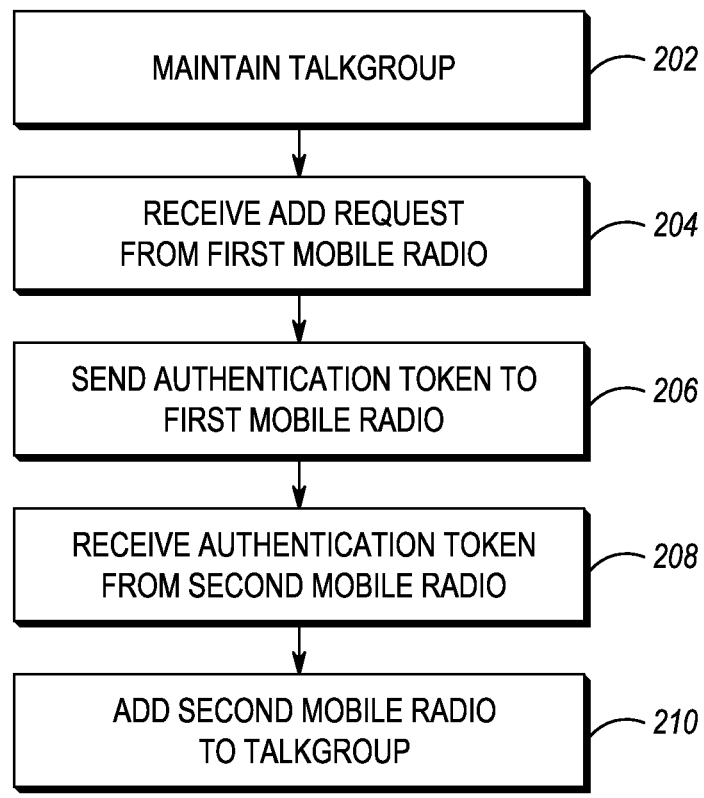
FIG. 2 depicts a flowchart of a process carried out by a radio-network switching system (RNSS), in accordance with at least one embodiment.
Figure 3:
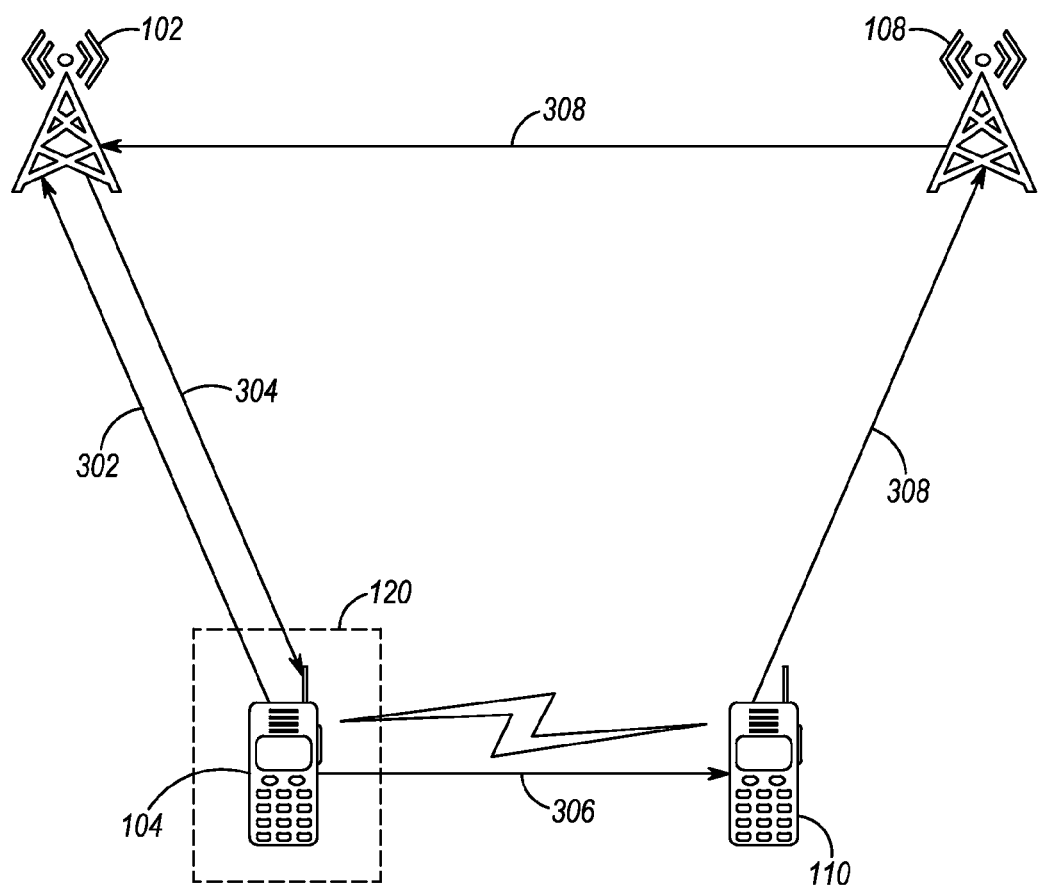
FIGS. 3 and 4 depict respective message flows, in accordance with at least one embodiment.
Figure 4:
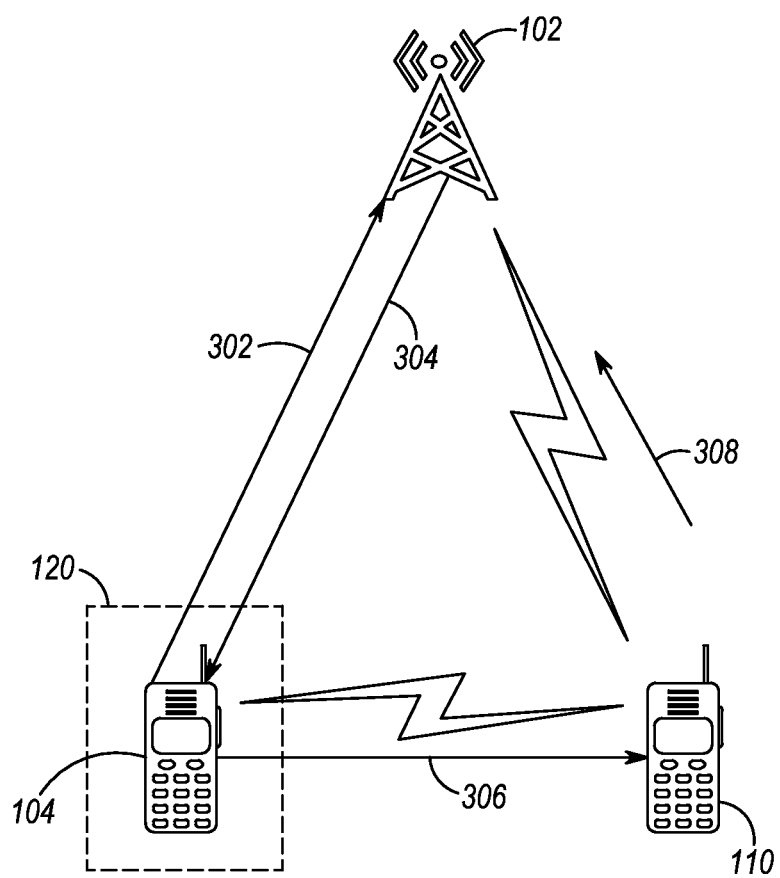

FIG. 2 depicts a flowchart of a process carried out by an RNSS, in accordance with at least one embodiment, and FIGS. 3 and 4 depict respective message flows, in accordance with at least one embodiment. As shown, process 200 begins at step 202 with RNSS 102 maintaining talkgroup 120 of mobile radios (the talkgroup including mobile radio 104). At step 204, RNSS 102 receives an add-mobile-radio request 302 from mobile radio 104, and at step 206, RNSS 102 responsively sends to mobile radio 104 an add-mobile-radio response 304 that includes an add-mobile-radio authentication token.

In at least one embodiment, RNSS 102, prior to sending the add-mobile-radio response 304 to mobile radio 104, generates the add-mobile-radio authentication token. The add-mobile-radio authentication token could take the form of (or include) a sequence of randomly-selected symbols such as one or more numbers and/or letters, among other possibilities.

At step 208, RNSS 102 receives from mobile radio 110 an add-mobile-radio authentication message 308 that identifies mobile radio 110 and that includes the add-mobile radio authentication token sent by RNSS 102 at step 206. In at least one embodiment, mobile radio 110 received the add-mobile-radio authentication token from mobile radio 104. The add-mobile-radio authentication token may have been received by mobile radio 110 via a short-range communication protocol and while in close proximity to mobile radio 104 (illustrated in FIG. 3 as a short-range communication 306). For example, mobile radio 110 may have received the add-mobile-radio authentication token from mobile radio 104 while being waved or held within several inches mobile radio 110 for several seconds, though certainly mobile radio 110 may have received the authentication token by other means. The short-range communication protocol could be a short-range wireless protocol (e.g., Bluetooth, NFC, direct mode land mobile radio (LMR), Infrared Data Association (IrDA), ZigBee, and/or Wi-Fi). The short-range communication protocol could instead (or additionally) be a short-range wired protocol (e.g., Universal Serial Bus (USB), IEEE 1394 (FireWire), and/or IEEE 802.3 (Ethernet)). Those of skill in the art will appreciate that the short-range communication protocol could take other forms as well.

In the embodiment illustrated in FIG. 3, RNSS 102 receiving add-mobile-radio authentication message 308 from mobile radio 110 includes receiving the add-mobile-radio authentication message via RNSS 108. For example, mobile radio 110, upon having received the add-mobile-radio authentication token from mobile radio 104, may have established air-interface link 112 with RNSS 108. Mobile radio 110 may have sent add-mobile-radio authentication message 308 (that included the add-mobile-radio authentication token) to RNSS 108 via the established air-interface link 112, and RNSS 108 may in turn have sent the received add-mobile-radio authentication message 308 to RNSS 102. If RNSS 102 receives add-mobile-radio authentication message 308 via RNSS 108, RNSS 102 may exchange talkgroup data (e.g., signaling or bearer communication) with mobile radio 110 via RNSS 108, among other possibilities.

In another embodiment, illustrated in FIG. 4, RNSS 102 receiving add-mobile-radio authentication message 308 from mobile radio 110 includes receiving the add-mobile-radio authentication message via an air-interface link between RNSS 102 and mobile radio 110. As an example, upon having received the add-mobile-radio authentication token from mobile radio 102, mobile radio 110 may have established an air-interface link with RNSS 102, and may have sent add-mobile-radio authentication message 308

(that included the add-mobile-radio authentication token) to RNSS 102 via the established air-interface link. And certainly additional example implementations could be listed here.

At step 210, and in response to receiving add-mobile-radio authentication message 308 at step 208, RNSS 102 adds the identified mobile radio (i.e., mobile radio 110) to talkgroup 120. In at least one embodiment in which RNSS 102 receives the add-mobile-radio authentication message via RNSS 108, RNSS 108 determines, prior to RNSS 102 receiving the add-mobile-radio authentication token, that mobile radio 110 is permitted to join talkgroup 120. RNSS 108 may have made such a determination based on, for example, a subscription profile that indicates whether mobile radio 110 is permitted to join talkgroups maintained by an RNSS other than RNSS 108. If RNSS 108 determines that mobile radio 110 is not permitted to join talkgroup 120, then RNSS 108 may refrain from passing add-mobile-radio authentication message 308 (and thus the add-mobile-radio authentication token) to RNSS 102.

RNSS 102 may confirm that the add-mobile-radio authentication token included in the received add-mobile-radio authentication message 308 matches the add-mobile-radio authentication token included in add-mobile-radio response 304 sent by RNSS 102 at step 206. In at least one embodiment, after sending add-mobile-radio response 304 (that includes the add-mobile-radio authentication token) to mobile radio 104, RNSS 102 stores the authentication token in a data storage. Upon receiving add-mobile-radio authentication message 308 from mobile radio 108, RNSS 102 compares the add-mobile-radio authentication token included in the received add-mobile-radio authentication message with the add-mobile-radio authentication token stored in the data storage. In at least one embodiment, RNSS 102 adds mobile radio 110 to talkgroup 120 only if RNSS 102 determines that the compared authentication tokens are matching tokens.

The add-mobile-radio authentication token may be associated with an authentication-token timer and, prior to adding the mobile radio identified in add-mobile-radio authentication message 308 (i.e., mobile radio 110) to talkgroup 120, RNSS 102 may confirm that the authentication-token timer has not expired. In at least one embodiment, after generating and/or sending add-mobile-radio response 304 (that includes the add-mobile-radio authentication token) to mobile radio 104, RNSS 102 starts a timer (e.g., a countdown timer) associated with the add-mobile-radio authentication token. Upon receiving add-mobile-radio authentication message 308 from mobile radio 110, RNSS 102 determines whether the authentication-token timer associated with the add-mobile-radio authentication token has expired. In at least one embodiment, RNSS 102 adds mobile radio 110 to talkgroup 120 only if RNSS 102 determines that the add-mobile-radio authentication token has not yet expired.

RNSS 102 may invalidate the add-mobile-radio authentication token after adding mobile radio 110 to talkgroup 120. RNSS 102 may subsequently receive a second add-mobile-radio authentication message that identifies a mobile radio and that includes the add-mobile-radio authentication token. The mobile radio identified in the second add-mobile-radio authentication message could be mobile radio 110 and/or any other mobile radio. In response to receiving the second add-mobile-radio authentication message, RNSS 102 may (i) determine that the authentication token is invalidated and (ii) deny the identified mobile radio access to the talkgroup.

This paragraph and the next together describe another processing sequence by which a mobile radio could be added to a talkgroup. In this example, RNSS 108 receives an add-mobile-radio request from mobile radio 110 and responsively sends to mobile radio 110 an add-mobile-radio response that includes an add-mobile-radio authentication token. Mobile radio 110 then sends an add-mobile-radio authentication message to mobile radio 104 via a short-range communication protocol and while in close proximity to mobile radio 104. The add-mobile-radio authentication message identifies mobile radio 110 and includes the add-mobile radio authentication token sent to mobile radio 110 by RNSS 108. Mobile radio 104 sends the received add-mobile-radio authentication message to RNSS 102, e.g., by establishing an air-interface link with RNSS 102 and sending the add-mobile-radio authentication message to RNSS 102 via the established air-interface link. RNSS 102, in turn, sends the received add-mobile-radio authentication message to RNSS 108.

In response to receiving the add-mobile-radio authentication message from RNSS 102, RNSS 108 determines that the add-mobile-radio authentication token included in the received add-mobile-radio authentication message matches the add-mobile-radio authentication token included in add-mobile-radio response sent to mobile radio 110 by RNSS 108. In response to making that determination, RNSS 108 sends an add-mobile-radio instruction (that identifies mobile radio 110) to RNSS 102. In response to receiving the add-mobile-radio instruction from RNSS 108, RNSS 102 confirms that the add-mobile-radio instruction was received from a trusted RNSS, and responsively adds the mobile radio identified in the add-mobile radio instruction (i.e., mobile radio 110) to talkgroup 120. And other similar examples could be presented.

Figure 5:
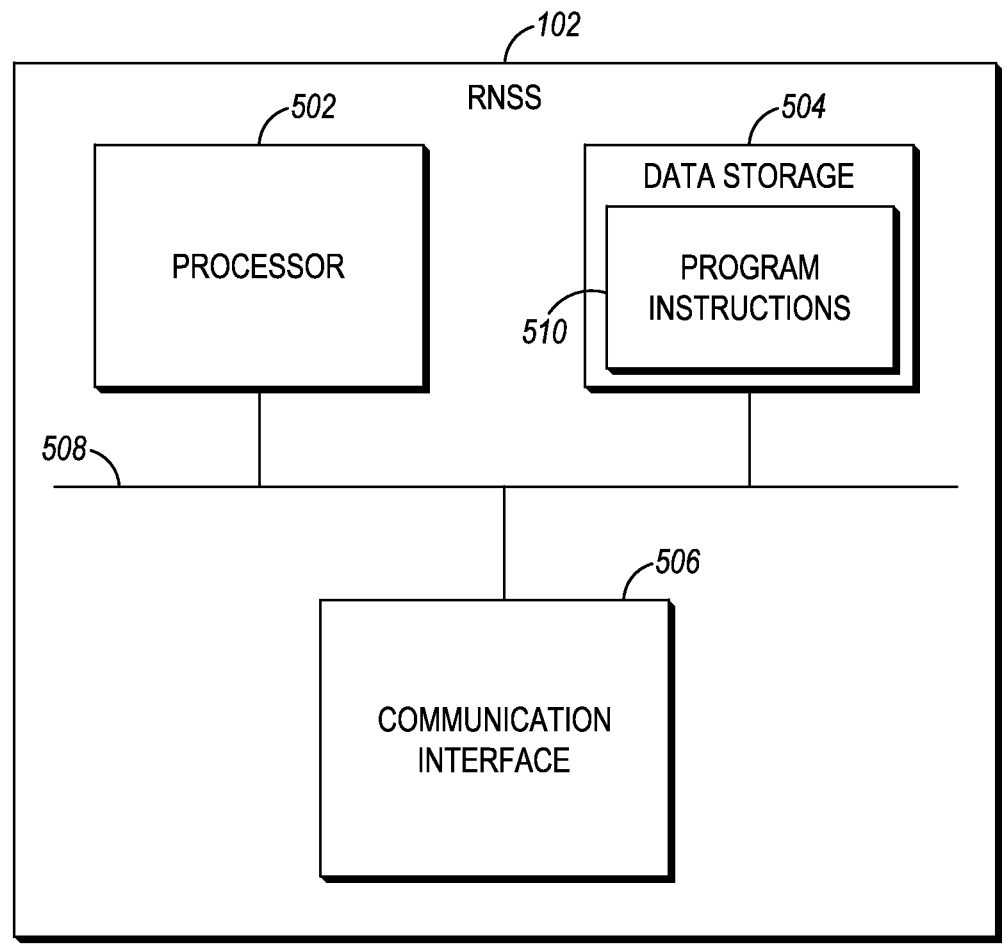
FIG. 5 depicts an RNSS, in accordance with at least one embodiment.

FIG. 5 depicts an RNSS, in accordance with at least one embodiment. As shown, RNSS 102 includes a processor 502, data storage 504, and a communication interface 506, each of which are interconnected via a system bus 508. Those having skill in the relevant art will appreciate that RNSS 102 could have additional and/or different components, and perhaps a different arrangement of components, among many other possible variations that could be listed here, and that RNSS 108 could take a form similar to the example RNSS 102 that is depicted in FIG. 5.

Processor 502 may include one or more processors of any type deemed suitable by those of skill in the relevant art, some examples including a microprocessor and a dedicated digital signal processor (DSP).

Data storage 504 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 5, data storage 504 contains program instructions 510 executable by processor 502 for carrying out various functions, though data storage 504 may contain different and/or additional data (such as operational data).

In an embodiment in which RNSS 102 is configured to carry out one or more processes and/or functions (such as the processes and functions described with reference to FIG. 2), program instructions 510 are executable by processor 502 for carrying out those functions. In instances where other entities described herein have a structure similar to that of the example RNSS 102 that is described in connection with FIG. 5, the respective program instructions 510 stored by the respective data storages 504 of those respective devices are executable by their respective processors 502 to carry out functions respectively performed by those devices.

Communication interface 506 may include (i) one or more wireless-communication interfaces for communicating according to one or more of the wireless-communication types and/or protocols mentioned above, and/or one or more other types and/or protocols deemed suitable by those having skill in the relevant art for a given implementation or in a given context and/or (ii) one or more wired-communication interfaces for communicating according to one or more types and/or protocols such as Ethernet, USB, and the like, and/or one or more other types and/or protocols deemed suitable by those having skill in the relevant art for a given implementation or in a given context. As such, communication interface 506 may include any necessary hardware (e.g., chipsets, antennas, Ethernet cards, etc.), any necessary firmware, and any necessary software for conducting one or more forms of communication with one or more other entities.

Figure 6:
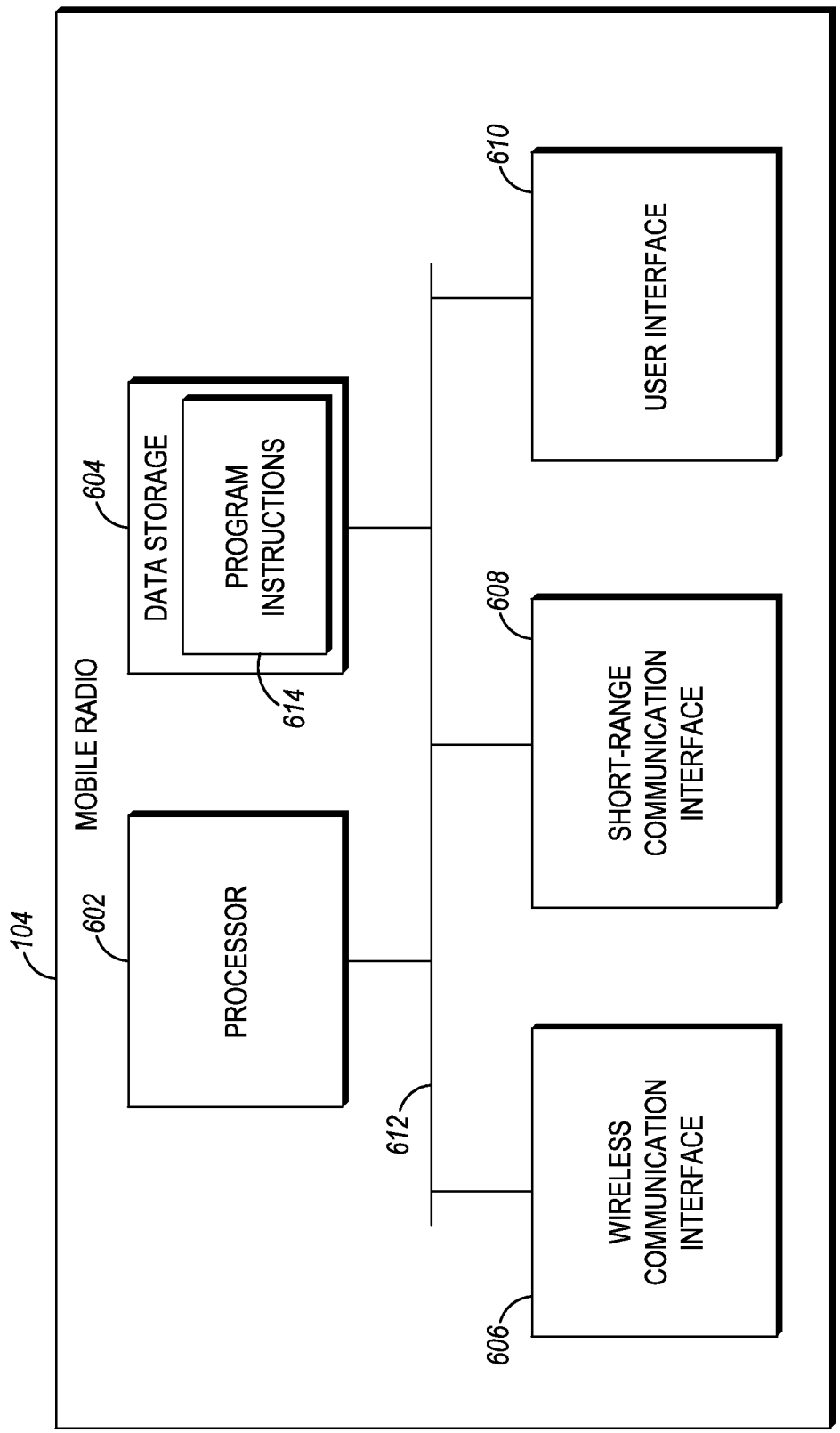
FIG. 6 depicts a mobile radio that is a member of a talkgroup, in accordance with at least one embodiment.

FIG. 6 depicts a mobile radio, in accordance with at least one embodiment. As shown, mobile radio 104 includes a processor 602, data storage 604 containing program instructions 614, a wireless communication interface 606, a short-range communication interface 608, and a user interface 610, each of which are interconnected via a system bus 612. Those having skill in the relevant art will appreciate that mobile radio 104 could have additional and/or different components, and perhaps a different arrangement of components, among many other possible variations that could be listed here. For example, user interface 610 may not be present in one or more embodiments. Mobile radio 110 could take a form similar to the example mobile radio 104 that is depicted in FIG. 6.

Processor 602 and data storage 604 may function in a manner similar to processor 502 and data storage 504. Communication interfaces 606 and/or 608 could take a form similar to that of communication interface 506 and may be adapted for wireless communication with one or more RNSSs (such as RNSS 102 and/or RNSS 108) and/or for short-range communication with one or more mobile radios (such as mobile radio 110), among other possible variations.

In an embodiment in which mobile radio 104 is configured to carry out one or more processes and/or functions (such as the processes and functions described below with reference to FIG. 7), program instructions 614 are executable by processor 602 for carrying out those functions. In instances where other entities described herein have a structure similar to that of the example mobile radio 104 that is described in connection with FIG. 6, the respective instructions 614 stored by the respective data storages 604 of those respective devices are executable by their respective processors 602 to carry out functions respectively performed by those devices.

Figure 7:
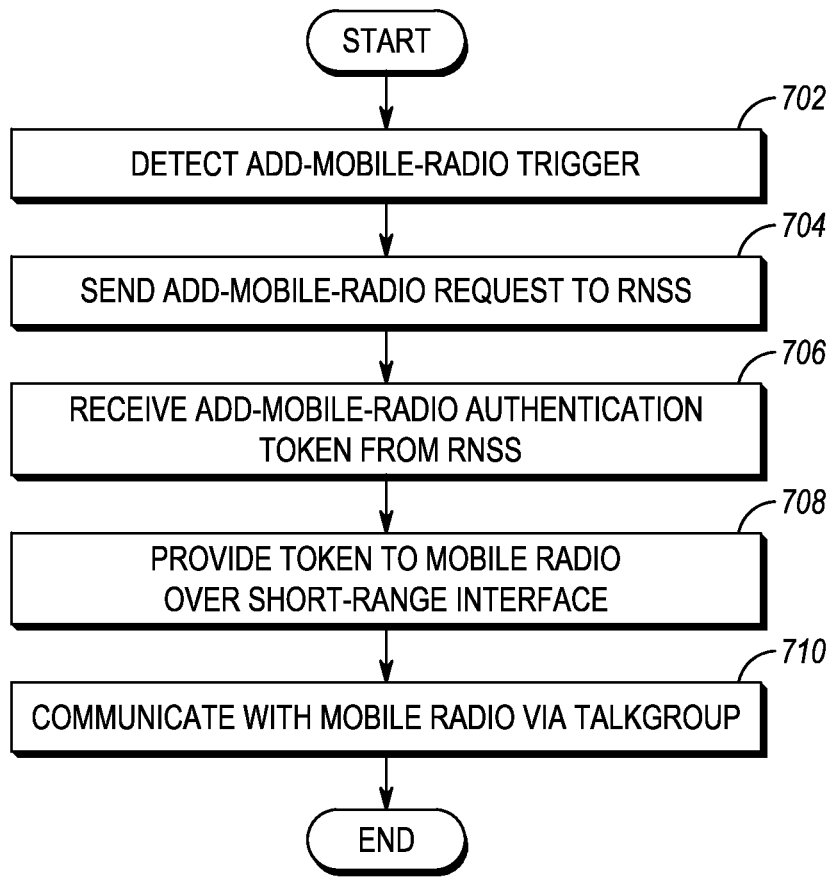
FIG. 7 depicts a flowchart of a process carried out by a mobile radio, in accordance with at least one embodiment.

FIG. 7 depicts a flowchart of a process carried out by a mobile radio that is a member of a talkgroup, in accordance with at least one embodiment. As shown, the process 700 begins at step 702 with mobile radio 104 (a member of talkgroup 120) detecting an add-mobile-radio trigger. Detecting the add-mobile-radio trigger could include, for example, detecting selection (perhaps via user interface 610) of an add-mobile-radio command or receiving a request from mobile radio 110 over short-range communication interface 608. At step 704 (and in response to detecting the add-mobile radio trigger at step 702), mobile radio 104 generates an add-mobile-radio request and sends the add-mobile-radio request to RNSS 102 using wireless communication interface 606.

At step 706 (and subsequent to transmitting the add-mobile-radio request to RNSS 102 at step 704), mobile radio 104 receives an add-mobile-radio response (that includes an add-mobile-radio authentication token) from RNSS 102 over wireless communication interface 606. At step 708, mobile radio 104 provides the add-mobile-radio authentication token to mobile radio 110 over short-range communication interface 608.

In at least one embodiment, mobile radio 110 receives the add-mobile-radio authentication token from mobile radio 104. Mobile radio 110 may receive the add-mobile-radio authentication token from mobile radio 104 via a short-range communication protocol and while in close proximity to the first mobile radio. The short-range communication protocol could take the form of (or include) near-field communication (NFC). As another possibility, the short-range communication protocol takes the form of (or includes) Bluetooth communication or direct mode land mobile radio (LMR) communication. Those of skill in the art will appreciate that other protocols may be used.

At step 710 (subsequent to providing the add-mobile-radio authentication token to mobile radio 110), mobile radio 104 communicates with mobile radio 110 via talkgroup 120.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first mobile radio that is a member of a talkgroup, the first mobile radio comprising:
   a first wireless communication interface;
   a second short-range communication interface;
   a processor; and
   data storage containing instructions executable by the processor for causing the first mobile radio to carry out a set of functions, the set of functions comprising:
      detecting an add-mobile-radio trigger;
      in response to detecting the add-mobile radio trigger, generating an add-mobile-radio request and sending the add-mobile-radio request to a first radio-network switching system over the first wireless communication interface;
      subsequent to transmitting the add-mobile-radio request to the first radio-network switching system, receiving an add-mobile-radio response from the first radio-network switching system over the first wireless communication interface, the add-mobile-radio response including an add-mobile-radio authentication token;
      providing the add-mobile-radio authentication token to a second mobile radio over the second short-range communication interface; and
      subsequent to providing the add-mobile-radio authentication token to the second mobile radio, communicating with the second mobile radio via the talkgroup.

2. The mobile of claim 1, wherein the second mobile radio receives the add-mobile-radio authentication token from the first mobile radio.

3. The mobile of claim 1, wherein the second mobile radio receives the add-mobile-radio authentication token from the first mobile radio via a short-range communication protocol and while in close proximity to the first mobile radio.

4. The method of claim 3, wherein the short-range communication protocol comprises near-field communication (NFC).

5. The method of claim 3, wherein the short-range communication protocol comprises Bluetooth communication or direct-mode land mobile radio (LMR) communication.

6. The method of claim 1, wherein detecting the add-mobile-radio trigger comprises detecting selection, via a user interface, of an add-mobile-radio command.

* * * * *